(12) United States Patent
Li

(10) Patent No.: US 9,995,943 B2
(45) Date of Patent: Jun. 12, 2018

(54) PHASE DIFFERENCE PLATE AND MANUFACTURING METHOD THEREOF, DISPLAY DEVICE

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 179 days.

(21) Appl. No.: 14/348,464

(22) PCT Filed: Dec. 12, 2013

(86) PCT No.: PCT/CN2013/089223
§ 371 (c)(1),
(2) Date: Mar. 28, 2014

(87) PCT Pub. No.: WO2014/190724
PCT Pub. Date: Dec. 4, 2014

(65) Prior Publication Data
US 2015/0301349 A1 Oct. 22, 2015

(30) Foreign Application Priority Data

May 30, 2013 (CN) .......................... 2013 1 0209410

(51) Int. Cl.
*G02B 27/26* (2006.01)
*G02B 5/20* (2006.01)
(Continued)

(52) U.S. Cl.
CPC ............. *G02B 27/26* (2013.01); *G02B 5/201* (2013.01); *G02B 5/3016* (2013.01);
(Continued)

(58) Field of Classification Search
None
See application file for complete search history.

(56) References Cited

U.S. PATENT DOCUMENTS 6,822,713 B1 * 11/2004 Yaroshchuk ........ G02F 1/13363
349/117
7,196,758 B2 * 3/2007 Crawford .......... G02F 1/133788
349/123
(Continued)

FOREIGN PATENT DOCUMENTS

CN 1399729 A 2/2003
CN 102243330 A 11/2011
(Continued)

OTHER PUBLICATIONS

International Search Report dated Mar. 20, 2014; PCT/CN2013/089223.
(Continued)

*Primary Examiner* — Anthony J Frost
(74) *Attorney, Agent, or Firm* — Ladas & Parry LLP; Loren K. Thompson

(57) ABSTRACT

A phase difference plate, a manufacturing method thereof and a display device are provided. The phase difference plate includes: a substrate; and a plurality of strip-shaped regions with an equal width, formed on the substrate and made of liquid crystal photoalignment material, wherein strip-shaped regions in which liquid crystal molecules in the liquid crystal photoalignment material are aligned in a horizontal direction and strip-shaped regions in which liquid crystal molecules in the liquid crystal photoalignment material are aligned in a vertical direction are arranged alternately along an arrangement direction, the horizontal direction is a direction parallel with the substrate and the vertical direction is a direction perpendicular to the substrate.

17 Claims, 3 Drawing Sheets

(51) Int. Cl.
  *G02B 5/30* (2006.01)
  *G02F 1/13363* (2006.01)

(52) U.S. Cl.
  CPC .... *G02F 1/13363* (2013.01); *B32B 2457/202* (2013.01); *G02F 2001/133631* (2013.01); *G02F 2001/133633* (2013.01); *G02F 2001/133638* (2013.01)

(56) References Cited

U.S. PATENT DOCUMENTS

| | | | |
|---|---|---|---|
| 2004/0241319 A1 | 12/2004 | Sa et al. | |
| 2008/0152844 A1* | 6/2008 | Hagihara | C08F 290/06 428/1.33 |
| 2009/0141201 A1* | 6/2009 | Yeh | H04N 13/0434 349/15 |
| 2009/0167968 A1* | 7/2009 | Hsu | G02B 27/2214 349/15 |
| 2009/0190107 A1* | 7/2009 | Holt | G03F 7/70291 355/44 |
| 2010/0209715 A1* | 8/2010 | Wang | C08F 283/006 428/425.6 |
| 2010/0239789 A1* | 9/2010 | Umeda | B29C 41/28 428/1.33 |
| 2012/0141689 A1* | 6/2012 | Park | G02B 5/32 427/493 |
| 2012/0257145 A1* | 10/2012 | Lee | G02B 5/3016 349/75 |

FOREIGN PATENT DOCUMENTS

| | | |
|---|---|---|
| CN | 102337140 A | 2/2012 |
| CN | 102419497 A | 4/2012 |
| CN | 102540316 A | 7/2012 |
| CN | 102604651 A | 7/2012 |
| CN | 102629000 A | 8/2012 |
| CN | 103293585 A | 9/2013 |
| CN | 203241665 A | 10/2013 |
| JP | 2005-326439 A | 11/2005 |
| WO | 01/18594 A2 | 3/2001 |

OTHER PUBLICATIONS

First Chinese Office Action dated Dec. 3, 2014; Appln. No. 201310209410.2.
Second Chinese Office Action Appln. No. 201310209410.2; dated May 26, 2015.
China Patent Certificate; dated Nov. 25, 2015; ZL 2013 1 0209410.2.
International Preliminary Report on Patentability dated Dec. 1, 2015; PCT/CN2013/089223.

* cited by examiner

PHASE DIFFERENCE PLATE AND MANUFACTURING METHOD THEREOF, DISPLAY DEVICE

TECHNICAL FIELD

Embodiments of the present invention relate to a phase difference plate, a manufacturing method thereof and a display device.

BACKGROUND

A fundamental principle for the 3D stereoscopic display lies in: two eyes of a viewer have a position difference generated by a interocular distance of about 60 mm, a left eye image and a right eye image with "binocular parallax" are incident into a left eye and a right eye respectively, and a stereoscopic effect is realized after fusion by the visual cortex of the brain. The 3D display technology is mainly classified into a naked-eye type and a glasses-type. The glasses-type mainly comprises a chromatic aberration type, a shutter glasses type and a polarization type stereoscopic display.

The polarization type stereoscopic display is a mainstream technology in current stereoscopic display field and has a basic structure in which a device configured to adjust a polarization direction of exiting light is disposed in front of a display panel. This device may be a phase difference plate, a liquid crystal cell or other device that can adjust a polarization direction of the exit light from different pixels. A principle of the phase difference plate stereoscopic display is shown in FIG. 1. At the display panel, one row displays a right eye image and another row displays a left eye image. A phase difference plate is placed on a light exiting side of the display panel and has one row of λ4 phase delay and directly adjacent one row of −λ/4 phase delay, thus a linearly polarized light emitted from the display panel becomes left-handed or right-handed circularly polarized light after passing through the phase difference plate. A stereoscopic effect may be generated by wearing left-handed and right-handed circularly polarized light glasses with corresponding polarization direction, with a structure as shown in FIG. 1. Thus, it is possible to make the right eye to only see the right eye image and the left eye to only see the left eye image, a perceptive stereoscopic effect is generated in the brain when these two images are superimposed.

A splitting-light principle of the phase difference plate is to make the linearly polarized light emitted from the display panel to form +45° or −45° angle with a major axis or a minor axis of a ¼ wave plate respectively, thereby changing the linearly polarized light into the left-handed or right-handed circularly polarized light respectively.

The ¼ wave plate having different domain directions is realized by the optical orientation technology. A manufacturing process for the current liquid crystal phase difference plate is as shown in FIG. 2: performing an exposure by using a mask, that is, exposing different regions by using ultraviolet light with different polarization directions to induce and obtain different vector orientations of liquid crystal molecules.

The above-mentioned method needs to adopt a special photosensitive monomer and liquid crystal material, and an ultraviolet light exposure device which can generate a linearly polarized ultraviolet light is needed, and it is necessary to cure liquid crystal along different light orientations by changing a polarization direction of the linearly polarized ultraviolet light, thus, a process is relatively difficult and liquid crystal molecules are performed a planar orientation parallel with a surface of a substrate. A conventional ultraviolet light exposure device can not satisfy the above condition, thereby increasing the production cost.

SUMMARY

Embodiments of the present invention provide a phase difference plate and a manufacturing method thereof, as well as a display device, which can be manufactured by using a current ultraviolet exposure device, hence reducing the manufacturing cost and the process complexity of the phase difference plate.

In one aspect, an embodiment of the present invention provides a phase difference plate comprising: a substrate; and a plurality of strip-shaped regions with an equal width, formed on the substrate and made of liquid crystal photoalignment material, wherein strip-shaped regions in which liquid crystal molecules in the liquid crystal photoalignment material are aligned in a horizontal direction and strip-shaped regions in which liquid crystal molecules in the liquid crystal photoalignment material are aligned in a vertical direction are arranged alternately along an arrangement direction, the horizontal direction is a direction parallel with the substrate and the vertical direction is a direction perpendicular to the substrate.

In another aspect, an embodiment of the present invention further provides a display device comprising: a display panel, comprising an array substrate and an opposed substrate cell-assembled and comprising a plurality of sub-pixels; and a phase difference plate as described above disposed on a light exiting side or a light entering side of the display panel.

In yet another aspect, an embodiment of the present invention further provides a manufacturing method of the above-mentioned phase difference plate, comprising steps: S1. forming a liquid crystal photoalignment layer on a substrate; S2. subjecting the liquid crystal photoalignment layer to two exposing processes to form a plurality of strip-shaped regions with an equal width, so that strip-shaped regions in which liquid crystal molecules in the liquid crystal photoalignment material are aligned in a horizontal direction and strip-shaped regions in which liquid crystal molecules in the liquid crystal photoalignment material are aligned in a vertical direction are arranged alternately along an arrangement direction; wherein the horizontal direction is a direction parallel with the substrate, the vertical direction is a direction perpendicular to the substrate, and the arrangement direction is a direction parallel with the substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention will be described in detail below with respect to accompanying drawings. The following embodiments are not intended to limit the scope of the embodiments of the present invention.

A First Embodiment

Figure 1:
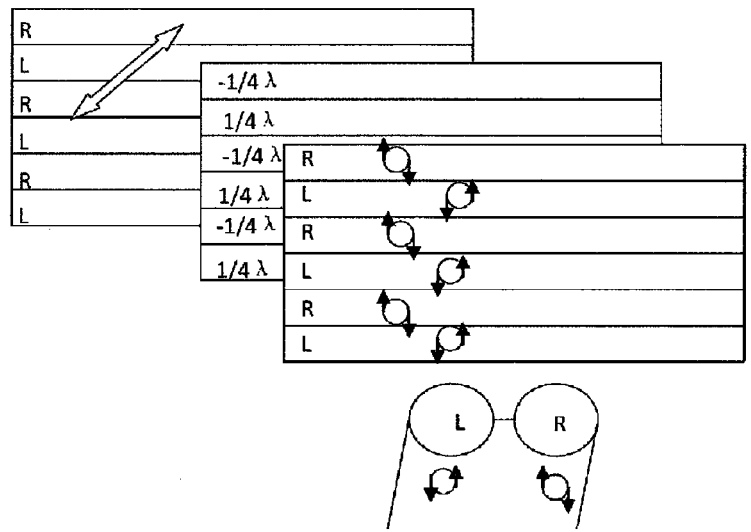
FIG. 1 is a principle view of a stereoscopic display by a phase difference plate.
Figure 2:
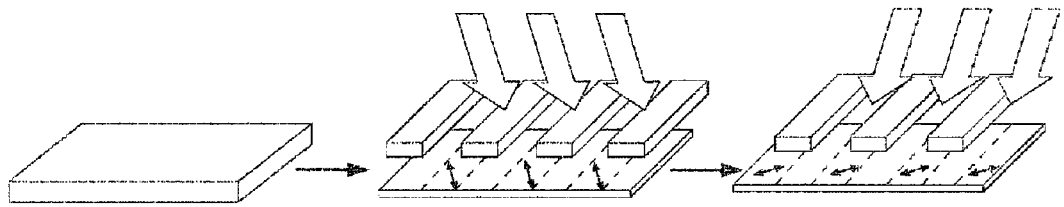
FIG. 2 is a process flow view for manufacturing a phase difference plate by using a conventional light aligning process.
Figure 3:
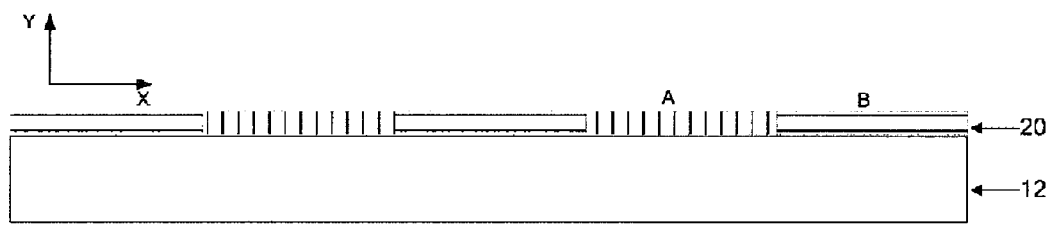
FIG. 3 is a structural schematic view of a phase difference plate according to an embodiment of the present invention.

The embodiment provides a phase difference plate 20, as shown in FIG. 3, comprising: a substrate 12; and a plurality of strip-shaped regions with an equal width formed on the substrate 12, which are made of liquid crystal photoalignment material. With regard to the plurality of strip-shaped regions, strip-shaped regions in which liquid crystal molecules in the liquid crystal photoalignment material are aligned in a horizontal direction and strip-shaped regions in which liquid crystal molecules in the liquid crystal photoalignment material are aligned in a vertical direction are arranged alternately along an arrangement direction (for example, a X direction), wherein the horizontal direction is a direction parallel with the substrate and the vertical direction is a direction perpendicular to the substrate. In FIG. 3, A is the strip-shaped region with the vertical orientation, and B is the strip-shaped region with a horizontal orientation.

Exemplarily, the liquid crystal photoalignment material used to form the phase difference plate according to the embodiment of the present invention is mainly formed by mixing azo liquid crystal material, photopolymerizable monomer, ultraviolet light photoinitiator and visible light photoinitiator. Under irradiation of light in a different waveband, the liquid crystal molecules in the liquid crystal photoalignment material are aligned in different directions.

Exemplarily, azobenzene liquid crystal material is a main core material used to form the phase difference plate and comprises mainly an organic substance containing an azobenzene functional group and can be optically aligned in different wavebands. Its molecules can be aligned in different directions by using the light in different wavebands. The azo liquid crystal material may be one or more of polyacrylate type side chain azobenzene liquid crystal, polyurethane type side chain azobenzene liquid crystal, polystyrene type side chain azobenzene liquid crystal, polyyne type side chain azobenzene liquid crystal, polysilane type side chain azobenzene liquid crystal, polyester type side chain azobenzene liquid crystal, polyether type side chain azobenzene liquid crystal, and polyimide type side chain azobenzene liquid crystal.

The photopolymerizable monomer is a photopolymerizable compound containing an active functional group and is mainly an acrylate kind substance functioning to cure liquid crystal having a certain alignment direction. The photopolymerizable monomer may be one or more of 1,4-butanediol acrylate, isobornyl acrylate, 1,6-hexanediol diacrylate, polyethanediol diacrylate.

The visible light photoinitiator functions to facilitate the photopolymerizable monomers to polymerize in a visible light waveband. The visible light photoinitiator may be one or more of fluorinated diphenyl titanocene and bis(pentafluorophenyl)titanocene.

The ultraviolet light photoinitiator functions to initiate a polymerizing crosslinking and grafting reaction by absorbing ultraviolet photons emitted by strong ultraviolet lamp. The ultraviolet light photoinitiator may be one or more of 2-hydroxyl-2-methyl-1-phenyl-1-acetone (UV 1173), benzoin diethyl ether (UV 651), 1-hydroxycyclohexyl phenyl ketone (UV 184), 2-methyl-1-(4-methylthio)-phenyl-morpholin-2-yl-1-acetone (UV 907), 2-phenylbenzyl-2-dimethylamino-4-morpholinopropyl phenyl ketone (UV 369), UV 1490, and UV 1700.

Exemplarily, in mixed material of the azo liquid crystal material, the photopolymerizable monomer, the ultraviolet light photoinitiator and the visible light photoinitiator, the mass of each of the ultraviolet light photoinitiator and the visible light photoinitiator is 0.5%~10% of that of the photopolymerizable monomer, and the sum of the mass of the visible light photoinitiator and the ultraviolet light photoinitiator is 1%~20% of that of the photopolymerizable monomer, for example, 5%~10%, wherein 5%~10% is highly advantageous for sufficient reaction between materials include in the mixed material and to avoid insufficiency or excess of each component in the mixed material, thereby obtaining good display effect by using material as less as possible.

Exemplarily, in the mixed material of the azo liquid crystal material, the photopolymerizable monomer, the ultraviolet light photoinitiator and the visible light photoinitiator, the mass of the photopolymerizable monomer is 1%~40% of the sum of the mass of the photopolymerizable monomer and the azobenzene liquid crystal, for example, 10%~30%. In a similar way, 10%~30% is highly advantageous for sufficient reaction between materials include in the mixed material and to avoid insufficiency or excess of each component in the mixed material, thereby obtaining good display effect by using material as less as possible.

Figure 4:
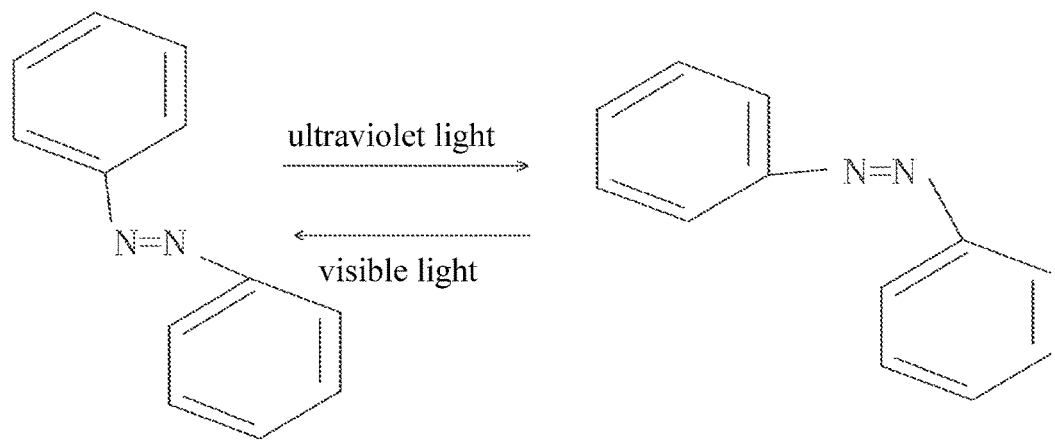
FIG. 4 is a schematic view showing an cis trans change of azobenzene liquid crystal material.

In a cis-trans isomerism, also known as a geometric isomerism, due to the presence of double bond (>C=C< . . . , >C=N—, —N=N—) or cycles in a molecule, rotation of a bond is hampered, causing atoms (or atom groups) to generate two different spatial arrangements. This kind of stereoisomerism is called cis-trans isomerism. The specific liquid crystal material used in the embodiment of the present invention is an azobenzene liquid crystal material containing azo-group (—N=N—) and atom organic pigments are linked at two ends of the azo-group. This material has a cis-trans isomerism feature. It is to be noted that this material has different alignments under irradiation of different waveband of light: under ultraviolet light illumination of a certain wavelength, azobenzene with a trans configuration is transited into that with a cis configuration; and under the visible light, the cis configuration may return to the trans configuration as shown in FIG. 4. Accordingly, liquid crystal molecules in the azobenzene liquid crystal material are vertically oriented or horizontally oriented under the action of the ultraviolet light or the visible light respectively, as shown in FIG. 4.

Exemplarily, a thickness d of each strip-shaped region satisfies a equation: $d=(m+\frac{1}{2})\lambda/\Delta n$, wherein m is an integer, $\lambda$ is a wavelength of incident light, $\Delta n$ is a birefringence of the azo kind liquid crystal material.

Herein, light transmitting through the strip-shaped regions in which the liquid crystal molecules are aligned in the vertical direction is not delayed, light transmitting through the strip-shaped regions in which the liquid crystal molecules are aligned in the horizontal direction has an optical path difference of $(m+\frac{1}{2})\lambda$, wherein m is a nonnegative integer, and $\lambda$ is a wavelength of incident light.

In the embodiment of the present invention, a structure in which strip-shaped regions in which the liquid crystal molecules are aligned in the horizontal direction and strip-shaped regions in which the liquid crystal molecules are aligned in the vertical direction are alternately arranged and have an equal width is formed on a substrate and the strip-shaped regions are made of liquid crystal photoalignment material. In the liquid crystal photoalignment material, azo liquid crystal material, photopolymerizable monomer, ultraviolet light photoinitiator and visible light photoinitiator are mixed. The liquid crystal photoalignment material has different alignment directions under irradiation of different waveband light so as to form different alignment regions with a mask and complete a phase difference plate, thereby reducing the manufacturing complexity of the phase difference plate.

A Second Embodiment

The second embodiment of the present invention provides a display device comprising: a display panel, comprising an array substrate and an opposed substrate cell-assembled and comprising a plurality of sub-pixels; a phase difference plate as described in the first embodiment of the present invention and disposed on a light exiting side or a light entering side of the display panel. The display device comprising the phase difference plate 20 can generate a glasses-type 3D display effect and has a strong stereoscopy.

Exemplarily, a width of each of the strip-shaped regions included in the phase difference plate along an arrangement direction is equal to a width of one sub-pixel of the display panel, and a length of each of the strip-shaped regions is integral multiple of a length of one sub-pixel, for example, equal to a length of one column/one row sub-pixels.

Figure 5:
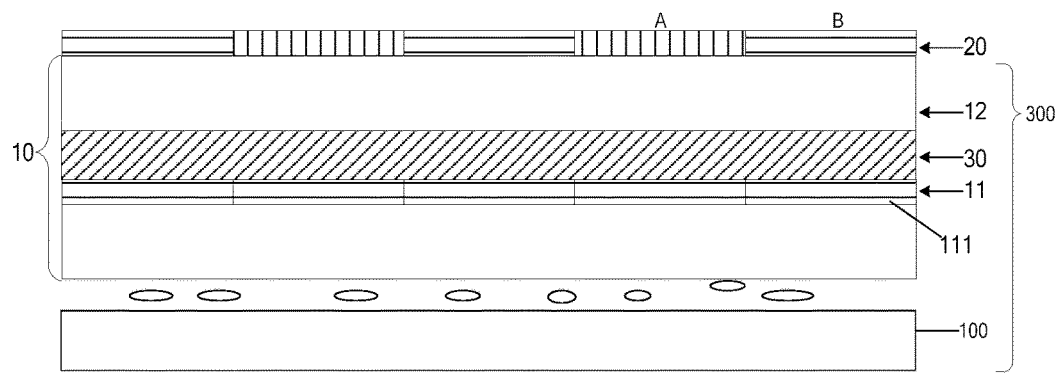
FIG. 5 is a cross-sectional view of a display device according to an embodiment of the present invention.
Figure 6:
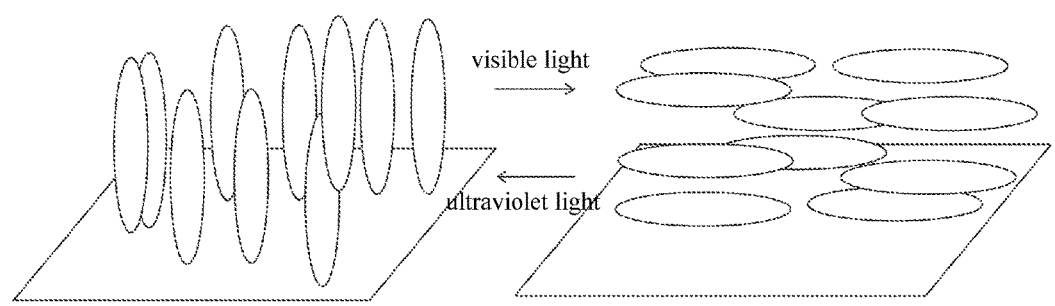
FIG. 6 is a schematic view showing an alignment change of liquid crystal molecules in azobenzene liquid crystal material.

Exemplarily, FIG. 5 shows a schematic cross-sectional view of a display device according to the embodiment of the present invention. As shown in FIG. 5, a display panel is a liquid crystal display panel 300, a phase difference plate 20 is disposed on a light exiting side of the display panel, the opposed substrate is a color filter substrate 10, and the display device further comprises a backlight source. A substrate 12 of the phase difference plate is a base substrate 12 of the color filter substrate, and along an arrangement direction, a width of each strip-shaped region is equal to a width of one sub-pixel 111 of the display panel. Further, the display panel comprises a first polarizer 30 disposed on a light entering side of the base substrate 12. Exemplarily, the first polarizer 30 may be disposed between the phase difference plate and the base substrate 12, which is not limited in the embodiment of the present invention.

Exemplarily, the display panel is an organic electroluminescence display panel or a plasma display panel; the phase difference plate is disposed on a light exiting side of the display panel, the substrate of the phase difference plate is the base substrate of the opposed substrate, and the display panel comprises a first polarizer disposed between the base substrate and the phase difference plate.

Exemplarily, the display panel is a liquid crystal display panel 300; the opposed substrate is a color filter substrate; the display device further comprises a backlight source, and the phase difference plate is disposed on a light entering side of the display panel, namely, between an array substrate and the backlight source.

It is to be noted that the substrate of the phase difference plate may also not be the same substrate as the base substrate of the opposed substrate of the display panel. A separately manufactured phase difference plate may be attached to the display panel.

A Third Embodiment

Figure 7:
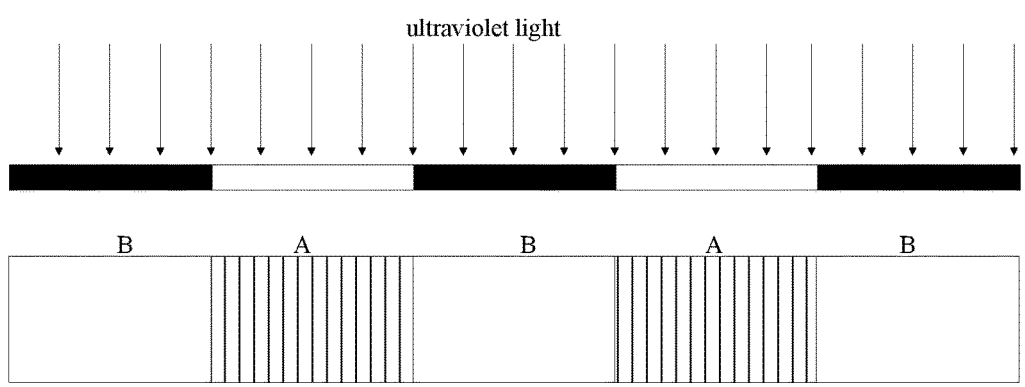
FIG. 7 is a principle view for forming strip-shaped regions in which in which liquid crystal molecules are aligned in a vertical direction according to an embodiment of the present invention.
Figure 8:
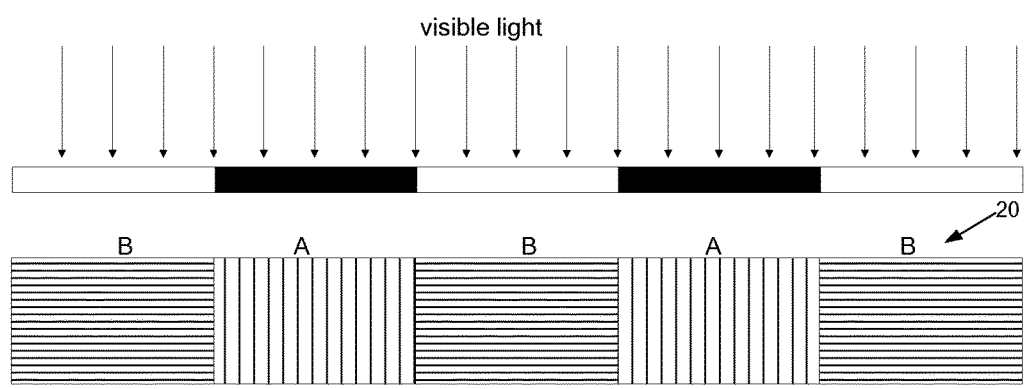
FIG. 8 is a principle view for forming strip-shaped regions in which in which liquid crystal molecules are aligned in a horizontal direction according to an embodiment of the present invention.

The third embodiment of the present invention provides a manufacturing method of the phase difference plate 20 described in the first embodiment of the present invention, as shown in FIGS. 7 and 8, comprising the following steps:

S1. forming a liquid crystal photoalignment layer on a substrate;

S2. subjecting the liquid crystal photoalignment layer to two exposing processes to form a plurality of strip-shaped regions with an equal width, so that strip-shaped regions in which liquid crystal molecules in the liquid crystal photoalignment material are aligned in a horizontal direction and strip-shaped regions in which liquid crystal molecules in the liquid crystal photoalignment material are aligned in a vertical direction are arranged alternately along an arrangement direction; wherein the horizontal direction is a direction parallel with the substrate, the vertical direction is a direction perpendicular to the substrate, and the arrangement direction is a direction parallel with the substrate.

Exemplarily, the liquid crystal photoalignment layer may be formed on the substrate by means of coating or spraying to prepare for forming the strip-shaped regions in the next step.

Exemplarily, the above-mentioned substrate is a color filter substrate and a width of each light-transmitting region or each light-shielding region along the arrangement direction is equal to a width of one sub-pixel of the color filter substrate.

Exemplarily, a material of the liquid crystal photoalignment layer is formed by mixing azo liquid crystal material, photopolymerizable monomer, ultraviolet light photoinitiator and visible light photoinitiator.

Exemplarily, the step S1 comprises: mixing the azo liquid crystal material, the photopolymerizable monomer, the ultraviolet light photoinitiator and the visible light photoinitiator uniformly and coating it uniformly onto the substrate according to a set coating thickness to form the liquid crystal photoalignment layer.

In the step S2 of the embodiment, the liquid crystal photoalignment layer is exposed twice for different regions. As shown in FIGS. 7 and 8, the strip-shaped regions in which the liquid crystal molecules in the liquid crystal photoalignment material are aligned in the vertical direction are denoted as A, and the strip-shaped regions in which the liquid crystal molecules in the liquid crystal photoalignment material are aligned in the horizontal direction are denoted as B.

Exemplarily, the step S2 comprises the following steps:

S10. placing a mask with light-transmitting regions and light-shielding regions alternately arranged over the liquid crystal photoalignment layer, as shown in FIG. 7;

S20. firstly making the light-shielding regions to correspond to the B regions to expose the A regions and exposing the liquid crystal photoalignment layer using the light-transmitting regions of the mask by means of ultraviolet light, so that liquid crystal molecules of the azo liquid crystal material are aligned along a direction being perpendicular to the substrate and thus, strip-shaped regions A in which liquid crystal molecules in the liquid crystal photoalignment material are aligned in a vertical direction are obtained. At this time, the ultraviolet light photoinitiator is excited and can absorb energy of the ultraviolet light, and thus, a free radical and a positive ion are generated, thereby inducing the photopolymerizable monomer to polymerize, crosslink and cure in the ultraviolet light waveband and fix the perpendicular alignment state of the liquid crystal molecules of the azo liquid crystal material;

S30. moving the mask by a distance of one sub-pixel to exchange positions of the light-transmitting regions and the light-shielding regions, thus, the A regions are shielded by the light-shielding regions and the B regions are exposed now, as shown in FIG. 8;

S40. exposing the liquid crystal photoalignment layer using the light-transmitting regions of the mask by means of visible light such that liquid crystal molecules of the azo liquid crystal material are aligned along a horizontal direction, and thus, strip-shaped regions B in which liquid crystal molecules in the liquid crystal photoalignment material are aligned in the horizontal direction are obtained. At this time, the visible light photoinitiator is excited to absorb energy of the visible light, and thus, a free radical and a positive ion are generated, thereby inducing the photopolymerizable monomer to polymerize, crosslink and cure in the visible light waveband and fix the horizontal alignment state of the liquid crystal molecules of the azo liquid crystal material.

It is to be noted that an order of the steps S20 and S40 may be exchanged.

Exemplarily, the step S2 according to the embodiment of the present invention may comprise the following steps:

S10. placing a mask with light-transmitting regions and light-shielding regions alternately arranged over the liquid crystal photoalignment layer;

S20. exposing the liquid crystal photoalignment layer using the ultraviolet light through the light-transmitting regions to form strip-shaped regions in which liquid crystal molecules are aligned in a vertical direction; and S30. exposing all of the liquid crystal photoalignment layer using the visible light to form strip-shaped regions in which liquid crystal molecules are aligned in a horizontal direction.

The above-mentioned one strip-shaped region corresponds to one sub-pixel of the color filter substrate.

A condition for aligning the liquid crystal molecules by using light in the embodiment is that: a temperature is a room temperature of about 25° C., and under the temperature, a photopolymerization speed is relatively fast; an exposure time is 0.1-15 minutes, preferably 3-10 minutes so that the polymer can be sufficiently polymerized and economy and efficiency can be guaranteed; the light intensity is above 10 mW, and the stronger the intensity is, the faster the polymerization is.

The above-mentioned manufacturing method of the phase difference plate should satisfy the following conditions:

1. after transmitted through the strip-shaped regions in which the liquid crystal molecules are aligned in the vertical direction, light is not delayed, and after transmitted through the strip-shaped regions in which the liquid crystal molecules are aligned in the horizontal direction, a light path difference of the light is $(m+½)\lambda/\Delta n$, wherein $\lambda$ is a wavelength of the incident light.

2. A thickness d of each of the strip-shaped regions satisfies a equation: $d=(m+½)\lambda/\Delta n$, wherein m is a non-negative integer, $\lambda$ is a wavelength of the incident light, $\Delta n$ is the birefringence of the liquid crystal photoalignment layer, such as, azo liquid crystal material.

In a process for bonding the phase difference plate and the display panel, in order to guarantee that polarization directions of two kinds of light emitting from the phase difference plate (namely, light emitted from the strip-shaped regions in which the liquid crystal molecules are aligned in the horizontal direction and light emitted from the strip-shaped regions in which the liquid crystal molecules are aligned in the vertical direction) are orthogonal to each other, a polarization direction of the linearly polarized light emitted from the display panel needs to form an angle of 45 degree with a vector of the liquid crystal molecules in the B regions in which the liquid crystal molecules are aligned in the horizontal direction.

A Fourth Embodiment

A difference between a manufacturing method of a phase difference plate in the fourth embodiment and the third embodiment lies in that, in the step S1, a plurality of regions with an equal width are firstly formed on the substrate, for example, a plurality of grooves (or micro-cups) with an equal width are formed, wherein gap walls between grooves (or micro-cups) may be small enough to be negligible, or may correspond to a width of a black matrix of the display panel; alternatively, a plurality of isolating walls with a small width are formed; and then different liquid crystal photoalignment material are alternately injected into the plurality of regions on the substrate to form a liquid crystal photoalignment layer comprising a plurality of regions with an equal width by an inkjet printing method, wherein one kind of liquid crystal photoalignment material is a material which can be cured by visible light and another kind is a material which can be cured by ultraviolet light.

In the step S2, the above-mentioned liquid crystal photoalignment layer comprising the plurality of regions with the equal width is exposed by respectively using the visible light and the ultraviolet light.

Exemplarily, regions in which the liquid crystal photoalignment material which can be cured by the visible light is disposed are exposed by the visible light, regions in which the liquid crystal photoalignment material which can be cured by the ultraviolet light is disposed are exposed with the ultraviolet light, such that materials in the different regions are cured respectively, thereby forming strip-shaped regions in which liquid crystal molecules are aligned differently. In an exposing process using the visible light, strip-shaped regions in which liquid crystal molecules are aligned in a horizontal direction are formed, and in an exposing process using the ultraviolet light, strip-shaped regions in which liquid crystal molecules are aligned in a vertical direction are formed.

Exemplarily, the liquid crystal photoalignment material that can be cured by the visible light is formed by mixing azo kind liquid crystal material, photopolymerizable monomer and visible light photoinitiator.

Exemplarily, the liquid crystal photoalignment material that can be cured by the ultraviolet light is prepared by mixing azo kind liquid crystal material, photopolymerizable monomer and ultraviolet light photoinitiator.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A phase difference plate, comprising:
a substrate; and
a plurality of strip-shaped regions with an equal width, formed on the substrate and made of liquid crystal photoalignment material,
wherein strip-shaped regions in which all liquid crystal molecules in the liquid crystal photoalignment material are substantially aligned in a horizontal direction and strip-shaped regions in which liquid crystal molecules in the all liquid crystal photoalignment material are substantially aligned in a vertical direction are arranged alternately along an arrangement direction, the horizontal direction is a direction parallel with the substrate and the vertical direction is a direction perpendicular to the substrate,
wherein the liquid crystal photoalignment material is a mixed material of azo liquid crystal material, photopolymerizable monomer, ultraviolet light photoinitiator and visible light photoinitiator, and
in the mixed material, a sum of a mass of the visible light photoinitiator and the ultraviolet light photoinitiator is 5%~10% of a mass of the photopolymerizable monomer, a mass of the photopolymerizable monomer is 10%~30% of a sum of a mass of the photopolymerizable monomer and the azobenzene liquid crystal, and the mass of each of the visible light photoinitiator and the ultraviolet light photoinitiator is 0.5~10% of the mass of the photopolymerizable monomer;
the azo liquid crystal material is one or more of polyurethane type side chain azobenzene liquid crystal, polyyne type side chain azobenzene liquid crystal, polysilane type side chain azobenzene liquid crystal, and polyester type side chain azobenzene liquid crystal.

2. The phase difference plate according to claim 1, wherein under irradiation of light in different wavebands, the liquid crystal molecules in the liquid crystal photoalignment material are aligned in different directions.

3. The phase difference plate according to claim 1, wherein each of the strip-shaped regions has an equal width along the arrangement direction.

4. The phase difference plate according to claim 1, wherein a thickness d of each of the strip-shaped regions satisfies a equation: $d=(m+½)\lambda/\Delta n$, wherein m is a nonnegative integer, $\lambda$ is a wavelength of incident light, $\Delta n$ is a birefringence of the liquid crystal photoalignment material.

5. The phase difference plate according to claim 4, wherein after transmitting through the strip-shaped regions in which the liquid crystal molecules are aligned in the vertical direction, light is not delayed, and after transmitting through the strip-shaped regions in which the liquid crystal molecules are aligned in the horizontal direction, light has an optical path difference of $(m+½)\lambda$, wherein m is a nonnegative integer, and $\lambda$ is a wavelength of incident light.

6. The phase difference plate according to claim 1, wherein the photopolymerizable monomer is one or more of 1,4-butanediol acrylate, isobornyl acrylate, 1,6-hexanediol diacrylate, polyethanediol diacrylate.

7. The phase difference plate according to claim 1, wherein the ultraviolet light photoinitiator is one or more of 2-hydroxy-2-methyl-1-phenyl-1-acetone (UV 1173), benzoin diethyl ether (UV 651), 1-hydroxycyclohexyl phenyl ketone (UV 184), 2-methyl-1-(4-methylthio)-phenyl-morpholin-2-yl-1-acetone (UV 907), 2-phenylbenzyl-2-dimethylamino-4-morpholinopropyl phenyl ketone (UV 369), UV 1490, and UV 1700.

8. A display device, comprising:
a display panel, comprising an array substrate and an opposed substrate cell-assembled and comprising a plurality of sub-pixels; and
a phase difference plate according to claim 1, disposed on a light exiting side or a light entering side of the display panel.

9. The display device according to claim 8, wherein a width of each of the strip-shaped regions of the phase difference plate along the arrangement direction is equal to a width of one sub-pixel of the display panel, and a length of each of the strip-shaped regions is integral multiple of a length of one sub-pixel.

10. The display device according to claim 8, wherein the phase difference plate is disposed on the light exiting side of the display panel, the display panel is a liquid crystal display panel, the opposed substrate is a color filter substrate, the display device further comprises a backlight source, a substrate of the phase difference plate is a base substrate of the color filter substrate, the display panel comprises a first polarizer disposed between the base substrate and the phase difference plate or on an light entering side of the base substrate.

11. The display device according to claim 8, wherein the phase difference plate is disposed on the light exiting side of the display panel, the display panel is an organic electroluminescence display panel or a plasma display panel; a substrate of the phase difference plate is a base substrate of the opposed substrate, and the display panel comprises a first polarizer disposed between the base substrate and the phase difference plate.

12. The display device according to claim 8, wherein the phase difference plate is disposed on the light entering side of the display panel, the display panel is a liquid crystal display panel, the opposed substrate is a color filter substrate and the display device further comprises a backlight source.

13. A manufacturing method of the phase difference plate according to claim 1, comprising the steps:
S1. forming a liquid crystal photoalignment layer on a substrate;
S2. subjecting the liquid crystal photoalignment layer to two exposing processes to form a plurality of strip-shaped regions with an equal width, so that strip-shaped regions in which liquid crystal molecules in the liquid crystal photoalignment material are aligned in a horizontal direction and strip-shaped regions in which liquid crystal molecules in the liquid crystal photoalignment material are aligned in a vertical direction are arranged alternately along an arrangement direction; wherein the horizontal direction is a direction parallel with the substrate, the vertical direction is a direction perpendicular to the substrate, and the arrangement direction is a direction parallel with the substrate, wherein the liquid crystal photoalignment material is a mixed material of azo liquid crystal material, photopolymerizable monomer, ultraviolet light photoinitiator and visible light photoinitiator, and in the mixed material, a sum of a mass of the visible light photoinitiator and the ultraviolet light photoinitiator is 1%~20% of a mass of the photopolymerizable monomer, a mass of the photopolymerizable monomer is 1%~40% of a sum of a mass of the photopolymerizable monomer and the azobenzene liquid crystal, and the mass of each of the visible light photoinitiator and the ultraviolet light photoinitiator is 0.5~10% of the mass of the photopolymerizable monomer.

14. The manufacturing method of the phase difference plate according to claim 13, wherein the step S2 comprises the steps:
   S10. placing a mask with light-transmitting regions and light-shielding regions alternately arranged over the liquid crystal photoalignment layer;
   S20. exposing the liquid crystal photoalignment layer using the ultraviolet light through the light-transmitting regions to form strip-shaped regions in which liquid crystal molecules are aligned in a vertical direction; and
   S30. exposing all of the liquid crystal photoalignment layer using the visible light to form strip-shaped regions in which liquid crystal molecules are aligned in a horizontal direction.

15. The manufacturing method of the phase difference plate according to claim 13, wherein the step S2 comprises the steps:
   S10. placing a mask with light-transmitting regions and light-shielding regions alternately arranged over the liquid crystal photoalignment layer;
   S20. exposing the liquid crystal photoalignment layer using the light-transmitting regions of the mask by means of ultraviolet light to form strip-shaped regions in which liquid crystal molecules are aligned in a vertical direction; and
   S30. moving the mask to exchange positions of the light-transmitting regions and the light-shielding regions;
   S40. exposing the liquid crystal photoalignment layer using the light-transmitting regions of the mask by means of visible light to form strip-shaped regions in which liquid crystal molecules are aligned in a horizontal direction;
   Or, the step S40 is before the step S20.

16. The manufacturing method of the phase difference plate according to claim 13, wherein the step S1 comprises steps:
   forming a plurality of grooves with an equal width on a substrate;
   injecting liquid crystal photoalignment materials which are cured respectively by visible light and ultraviolet light into the plurality of grooves,
   wherein in the step S2, the liquid crystal photoalignment layer is exposed by respectively using the visible light and the ultraviolet light.

17. The manufacturing method of the phase difference plate according to claim 13, wherein conditions for the step S2 are: room temperature, exposure time of 0.1-15 minutes and light intensity of over 10 mW.

\* \* \* \* \*